(12) United States Patent
Beck

(10) Patent No.: US 8,209,919 B2
(45) Date of Patent: Jul. 3, 2012

(54) MOUNTING SUPPORT FOR PHOTOVOLTAIC MODULES

(75) Inventor: Bernhard Beck, Volkach (DE)

(73) Assignee: Blitzstrom GmbH, Kolitzheim (DE)

( * ) Notice: Subject to any disclaimer, the term of this patent is extended or adjusted under 35 U.S.C. 154(b) by 273 days.

(21) Appl. No.: 12/263,815

(22) Filed: Nov. 3, 2008

(65) Prior Publication Data

US 2009/0134297 A1 May 28, 2009

(30) Foreign Application Priority Data

Nov. 23, 2007 (DE) .......................... 10 2007 056 619

(51) Int. Cl.
| | |
|---|---|
| E04H 12/18 | (2006.01) |
| E04H 14/00 | (2006.01) |
| E04D 1/00 | (2006.01) |
| A47G 29/02 | (2006.01) |
| A47F 5/00 | (2006.01) |
| H01L 31/042 | (2006.01) |
| F24J 2/46 | (2006.01) |
| F24J 2/36 | (2006.01) |
| B32B 3/28 | (2006.01) |

(52) U.S. Cl. ........ 52/173.3; 52/108; 52/506.05; 52/551; 248/237; 248/316.8; 136/244; 126/623; 126/624; 428/167; 428/906

(58) Field of Classification Search ................... 52/108, 52/173.3, 506.05, 551, 716.8, 718.01–718.05; 248/148, 237, 224.51, 308, 316.8; 136/244; 126/623, 624; 428/167, 172, 906

See application file for complete search history.

(56) References Cited

U.S. PATENT DOCUMENTS

| | | | | | |
|---|---|---|---|---|---|
| 2,378,515 | A | * | 6/1945 | Tidwell | 52/108 |
| 3,425,889 | A | * | 2/1969 | Willits, Jr. | 248/220.43 |
| 3,925,943 | A | * | 12/1975 | Petrie | 135/125 |
| 4,660,348 | A | * | 4/1987 | LaLonde | 52/506.08 |
| 4,783,946 | A | * | 11/1988 | Boegle | 52/506.1 |
| 4,856,247 | A | * | 8/1989 | Georgino | 52/404.3 |
| 5,155,952 | A | * | 10/1992 | Herwegh et al. | 52/100 |
| 6,065,255 | A | * | 5/2000 | Stern et al. | 52/173.3 |
| 6,617,507 | B2 | | 9/2003 | Mapes et al. | |
| 6,675,580 | B2 | * | 1/2004 | Ansley et al. | 60/641.8 |
| 7,365,266 | B2 | * | 4/2008 | Heckeroth | 136/251 |
| 7,758,011 | B2 | * | 7/2010 | Haddock | 248/500 |
| 2003/0094193 | A1 | * | 5/2003 | Mapes et al. | 136/244 |

(Continued)

FOREIGN PATENT DOCUMENTS

DE 28 09 031 A1 9/1979

(Continued)

*Primary Examiner* — Brian Glessner
*Assistant Examiner* — Omar Hijaz
(74) *Attorney, Agent, or Firm* — Henry M. Feiereisen; Ursula B. Day

(57) ABSTRACT

A mounting support for mounting photovoltaic modules constructed with at least one glass pane on a flat roof surface includes a flexible elongated strip having a bottom side with a substantially smooth surface for attachment to the roof surface and a top side with a substantially smooth surface for supporting the photovoltaic modules. The top side of the strip includes recesses oriented perpendicular to the longitudinal direction of the strip and separating strip segments which allows the mounting support or strip to be easily rolled up. The strip segments include integrally formed fastening members configured to engage with cooperating fasteners for securing the photovoltaic modules on top side of the strip. The top surface may also include longitudinal grooves or tubes holding the fastening members.

17 Claims, 6 Drawing Sheets

U.S. PATENT DOCUMENTS

| | | |
|---|---|---|
| 2004/0074205 A1 | 4/2004 | Stache |
| 2004/0104315 A1* | 6/2004 | Betz .............................. 248/74.2 |

FOREIGN PATENT DOCUMENTS

| | | |
|---|---|---|
| DE | 30 01 479 A1 | 7/1980 |
| DE | 32 14 421 A1 | 10/1983 |
| DE | 198 28 462 A1 | 1/2000 |
| DE | 103 29 184 A1 | 1/2005 |
| DE | 20 2006 016 382 | 2/2007 |
| DE | 202007007207 | 9/2007 |
| WO | WO 2008/063660 | 5/2008 |

* cited by examiner

MOUNTING SUPPORT FOR PHOTOVOLTAIC MODULES

CROSS-REFERENCES TO RELATED APPLICATIONS

This application claims the priority of German Patent Application, Serial No. 10 2007 056 619.2, filed Nov. 23, 2007, pursuant to 35 U.S.C. 119(a)-(d), the content of which is incorporated herein by reference in its entirety as if fully set forth herein.

BACKGROUND OF THE INVENTION

The present invention relates to a photovoltaic module, and more particularly to a support for installing a photovoltaic module on a roof.

Nothing in the following discussion of the state of the art is to be construed as an admission of prior art.

Solar energy collectors can be installed on a flat roof by arranging photovoltaic or solar modules constructed with glass panels in side-by-side relationship. These modules are planar panel-like assemblies in form of rectangular or square planar panels. The panels are typically supported on the roof surface (e.g., tarpaper, tiles, plastic foil) by concrete blocks placed on the flat roof, with a corresponding support structure connected to the concrete blocks. The modules are mounted on the support structure. As the support structure, which may further include concrete blocks, is very heavy, this weight must be taken account in static calculations for the roof and the building. In addition, the material costs are also very high.

The German utility model DE 20 2006 016 382 U1 discloses a support structure which includes upper rooftop supports, support braces, transverse shelves and bottom supports and is placed on a water-tight roof surface by interposing construction mats and held only by gravity, i.e., without being anchored, because the weight anchors the structure. This structure, a concrete blocks/support structure as well as a support structure constructed from support braces, will be generally referred to as "mounting support". A drawback of the support structure described in DE 20 2006 016 382 U1 is the use of modular photovoltaic foils which are connected with a mounting foil glued to the roof surface of the flat roof because of a low energy efficiency of the modular foil.

It would therefore be desirable and advantageous to provide an improved support for mounting photovoltaic modules on a flat roof surface to obviate prior art shortcomings and to eliminate the heavy substructure typically associated with the installation of photovoltaic cells disposed on a glass pane.

SUMMARY OF THE INVENTION

According to one aspect of the invention, a mounting support for mounting photovoltaic modules constructed with at least one glass pane on a flat roof surface includes a flexible elongated strip configured to be wound and unwound in a longitudinal direction of the strip, wherein a bottom side of the strip has a substantially smooth surface for attachment to the roof surface and a top side of the strip has a substantially smooth surface for receiving the photovoltaic modules, and fastening members arranged in the top side of the strip with a predetermined spacing therebetween in the longitudinal direction and forming an integral component of the strip, wherein the fastening members are configured to engage with cooperating fasteners for securing the photovoltaic modules on top side of the strip.

This type of support advantageously allows mounting of photovoltaic modules based on glass technology without a heavy substructure. The support according to the invention (here also referred to as flexible tape, mounting foil, web) can be readily transported when rolled up, and can be easily handled during installation. The mounting support is already well prepared for the installation because the fastening members are preinstalled. The proposed mounting device is not limited to flat roofs.

By using supports with different heights, the angle of incidence of the radiation onto the photovoltaic modules can be adjusted. For example, the angle of incidence can be adapted to optimize the angle of incidence for roofs with a predetermined pitch. Advantageously, the bottom side of the strip may be attached to the roof surface with an adhesive, or longitudinal edges of the bottom side of the strip may be welded to the roof surface.

According to another advantageous feature of the present invention, the top side of the strip may include recesses oriented perpendicular to the longitudinal direction of the strip, with the recesses separating corresponding strip segments, and the fastening members may be arranged in a part of the strip segments. With this approach, elongated mounting supports can be provided which may prevent the material from protruding over the edges of the rolled-up support. In addition, rainwater entering between the photovoltaic modules can be easily diverted to the sides.

According to another advantageous feature of the present invention, the repeat pattern between two adjacent fastening members can correspond to, for example, four or five segments. However, other repeat patterns are feasible depending on the application.

According to another advantageous feature of the present invention, the top side of the strip may include grooves oriented in the longitudinal direction of the strip and forming ribs therebetween, wherein the fastening members are arranged in at least part of the ribs. In this way, the repeat pattern can advantageously be freely selected, because there a no longer defined transverse grooves in form of recesses.

According to another advantageous feature of the present invention, the top side of the strip may include a plurality of small tubes, with the fastening members, e.g., a threaded element, being arranged in at least one of the tubes. Such tube system, which preferably has a honeycomb structure, allows the mounting support to be easily rolled up, while still allowing a flexible installation.

It should be mentioned that the fastening members should protrude only slightly over the top side of the mounting support, so that the mounting support can be uniformly rolled up into a roll. A maximum overhang of half the thickness of the support can already be considered as a limit. Advantageously, the overhang does not to exceed 30%, preferably 15%, of the thickness of the support. Most preferably, the fastening members is completely integrated in the support so as not to hinder the support from being rolled up or unrolled.

The fastening members in the segments, webs or tubes may advantageously include threaded sleeves integrated in the mounting support which are adapted to receive clamps. This allows the use of frameless photovoltaic modules. For example, a photovoltaic foil is placed between two glass panes in form of a sandwich structure. The fastening members are designed so as to readily withstand a suction force of about 15 kg/m$^2$. This can be accomplished, for example, by attaching anchors to the threaded sleeves or by selecting other types of fastening members.

The mounting support (mounting foil, web, tape) can be constructed in a single piece, wherein the recesses may be cut or milled from a plastic foil having a thickness of between 1 cm to 3 cm (single-layer construction) for forming the intermediate segments. However, a mounting foil consisting of two layers in form of a sandwich construction (two-layer construction) may also be employed. The bottom side is configured for attachment to the roof surface and the top side is adapted to secure the photovoltaic modules and may have transverse recesses, longitudinal grooves or tubes. In both embodiments, the mounting foils are flexible, i.e., bendable.

The shape of the recesses, grooves or tubes is not critical, provided they allow the support to be wound onto a winding spindle without squeezing the material.

Depending on the mounting method on the roof layer and the fastening members, the lateral edges of the mounting support may advantageously also include a recess, which could be used, for example, to precisely guide a welding apparatus. In a two-layer structure, the bottom layer would then be continuous without recesses, whereas the top layer would have island-shaped raised portions representing the segments. Such embodiment would be of interest because of low material consumption and a small weight.

In general, the modules described above are placed essentially parallel to the roof surface. In the finished structure, the unrolled mounting support would be attached to the roof layer, while another similar mounting support may be secured in parallel alignment thereto on the roof layer.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 7b shows a cross-sectional view of the mounting support taken along the line X-X in FIG. 7a;

FIG. 7c shows a side view with a grooved structure of another embodiment of the mounting support taken along the line Y-Y in FIG. 7a;

FIG. 8b shows a cross-sectional view of the mounting support taken along the line Z-Z of FIG. 8a.

DETAILED DESCRIPTION OF PREFERRED EMBODIMENTS

Figure 1:
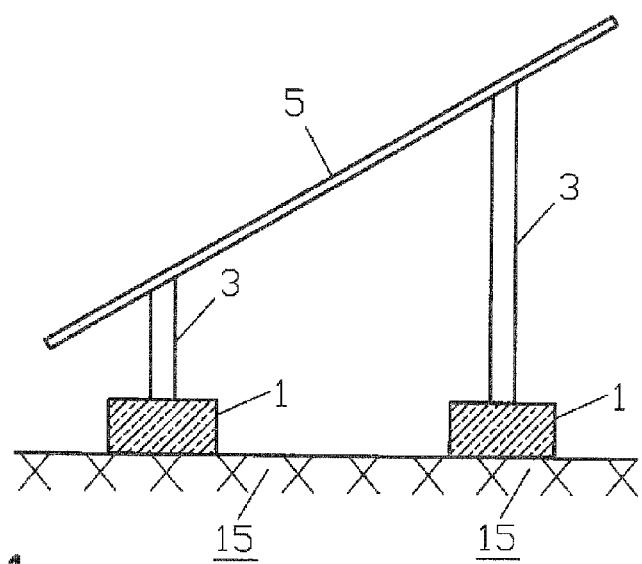
FIG. 1 shows a conventional structure with photovoltaic modules on a flat roof.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
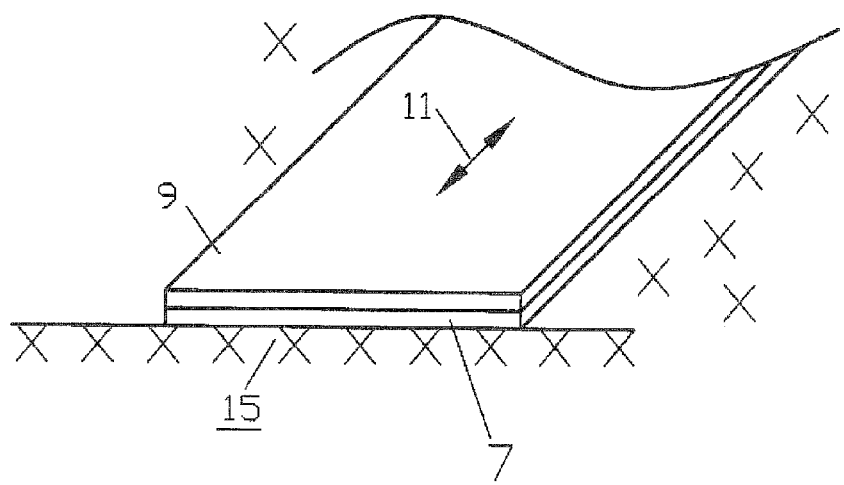
FIG. 2 shows a conventional structure with a photovoltaic foil on a flat roof.

Turning now to the drawing, and in particular to FIGS. 1 and 2, there are shown two conventional methods for securing a solar collector facility to a flat roof. FIG. 1 shows a conventional installation of photovoltaic modules, wherein concrete blocks 1 placed on a water-tight and air-tight roof surface 15 of a roof. Connected thereto is a support structure 3, on which conventional photovoltaic modules 5 constructed with glass panes are mounted. Disadvantageously, this overall structure is heavy, so that its weight and structural arrangement must be taken into consideration when performing static calculations. Moreover, large quantities of materials are required. However, the photovoltaic assembly has a high efficiency, because the photovoltaic modules 5 with one or two glass panes can be mounted at a favorable angle with respect to the horizontal orientation of the roof.

FIG. 2 depicts a second conventional installation, wherein a mounting foil 7 is glued on the roof surface 15 of a flat roof, and a photovoltaic module foil 9 is connected to the foil 7. This embodiment generates only a small roof load and has low material costs. However, the efficiency of module foils is also low. Installation is simple and advantageous, because the foils 7, 9 only need to be rolled out in a winding/unwinding direction 11 and connected to the roof surface with an adhesive or by welding.

Figure 3:
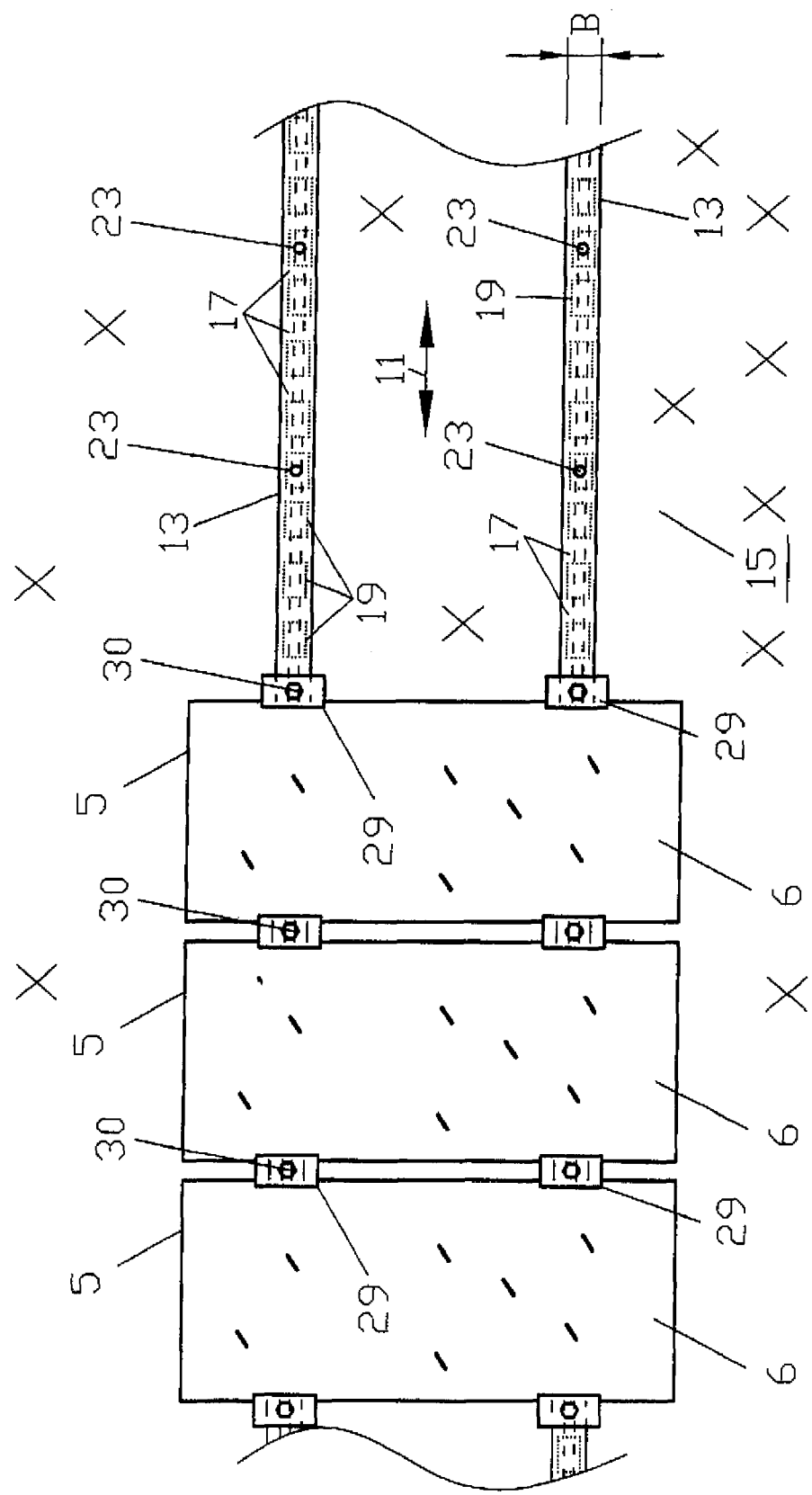
FIG. 3 shows a top view of a mounting support according to the invention.

Referring now to FIG. 3, there is shown a schematic illustration of an embodiment according to the invention with two elongated mounting supports 13 arranged in parallel, which may also be referred to as mounting foil. These may be constructed of a relatively thin plastic foil and are flexible. On the left side of FIG. 3, three photovoltaic modules 5 having a top side with glass pane 6 are mounted adjacent to each other on the supports 13, whereas the right side of FIG. 3 shows a region of a roof surface 15 where modules 5 have not yet been placed. The modules 5 are here configured as frameless modules. A second glass pane may be disposed on the backside.

The mounting supports 13 may be constructed in form of elongated strips, tapes or webs having a width in a range between 10 cm and 20 cm and a length of, for example, between 5 m and 12 m. They may be rolled up before installation to save space (see FIG. 6). Recesses 17 are cut or milled into the surface of each support 13 which extend from edge to edge of the strip, defining segments 19 therebetween. This shape of recesses 17 is advantageous for single-layer and two-layer foils. The segments 19 formed in this way extend transversely to the winding/unwinding direction 11 and have a length corresponding to the width of the mounting support 13. In particular, the cross-section of the recesses 17 can be wedge-shaped or triangular.

Figure 4:
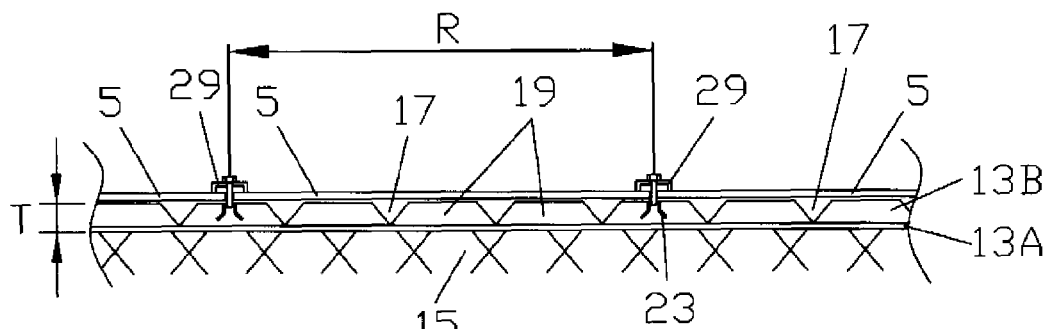
FIG. 4 shows a cross-sectional view of the mounting support of FIG. 3.
Figure 5:
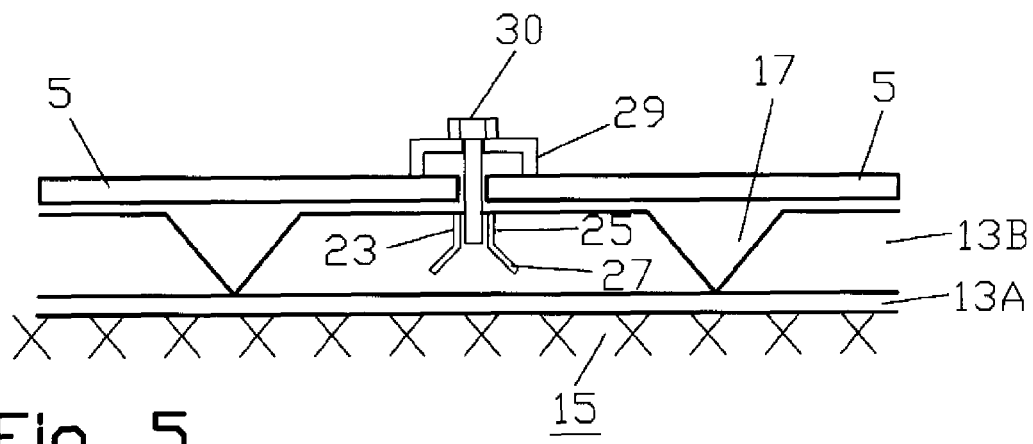
FIG. 5 shows a cross-sectional view of a single segment of FIG. 4.

FIGS. 4 and 5 show two-layer mounting supports 13 formed of two layers 13A, 13B (sandwich construction), wherein the bottom layer 13A represents the actual mounting foil for attachment to the roof surface 15. The layer 13A is configured to connect to the actual roof surface 15 (roofing paper, copper roof, plastic roof, layer of smooth tiles, etc.). The top layer 13B forming the segments 19 is adapted to securely attach the photovoltaic modules 5. In the embodiment with a single-layer as well as with a two-layer support 13, the bottom side of the mounting support 13 has a substantially planar structure, so that it can be fixedly attached to the roof surface 15, in particular glued by using an adhesive or welded at its edges. The top side has a substantially planar structure adapted to support and securely hold the photovoltaic elements 5.

In the exemplary embodiment depicted in FIGS. 3-5, the thickness T of the composite support 13A, 13B may be between 50 mm and 30 mm. The two layers 13A, 13B may in principle be constructed of different materials. For example, the top layer 13B may be made of a glass fiber reinforced material.

FIG. 4 shows a complete centrally located rectangular module 5 and a partial view of two adjacent identical modules 5 disposed on either side, wherein the glass pane 6 has been omitted. FIG. 5 shows in part two adjacent modules 5.

As seen from the exemplary embodiment depicted in FIGS. 3 and 4, each fourth segment 19 has a fastening member 23, wherein the fastening members 23 have a spacing R which corresponds to the width M of a module 5. In this way, at least one photovoltaic module 5 can be connected at its edges directly or indirectly with the support 13. However, it will be understood that instead of each fourth segment 13 any other suitable pattern can be selected for the spacing between the fastening members, for example six segments 19.

Is the exemplary embodiment depicted in FIGS. 4 and 5, the fastening member 23 is implemented as a threaded sleeve or bushing 25 inserted in the top layer 13B. The sleeve or bushing 25 is connected with one or more anchoring wings 27 (see FIG. 5) to prevent it from being pulled out of the support. As illustrated in the left part of FIG. 3 and in FIGS. 4 and 5, a corresponding screw 30 is screwed into the thread of the sleeves or bushings 25. The screw 30 holds a clamp 29, for example a metal clamp, which is supported on the surface of adjacent modules near their respective edges, thereby affixing the corresponding module 5 on the mounting support 13. As shown in FIGS. 4 and 5, the clamp 29 is here particularly formed as a two-sided clamp. The clamp 29 shown in FIG. 5 therefore secures both the right edge of the left module 5 and the left edge of the right module 5 to the top surface of the support 13 (shown here with a spacing). In other words: adjacent modules 5 on each fastening member share a clamp 29 after completion of the connection.

Preferably, a spacer made of a soft material, for example rubber, is placed between the bottom side of the clam 29 and the top surface of the respective module 5.

It is important for ease of handling that the fastening members 23 form an integral component of the tape 13.

Figure 6:
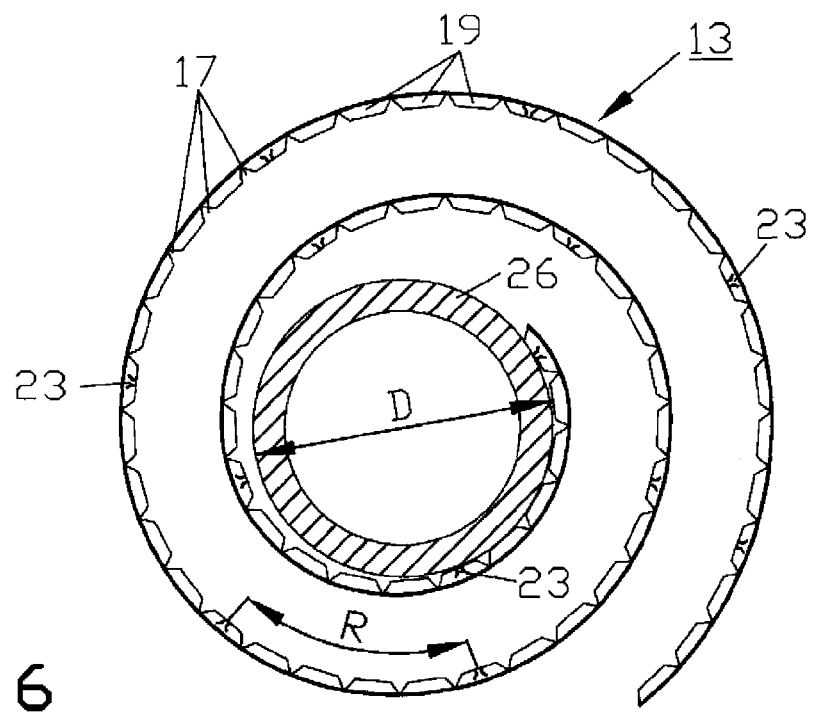
FIG. 6 shows the rolled-up mounting support or mounting foil.

FIG. 6 shows a rolled-up mounting or attachment support 13. For clarity, the individual layers on the drum are here shown as being spaced apart. The recesses 17 and the segments 19 facilitate winding of the mounting support 13. It is evident from FIG. 6 that the diameter D of a winding spindle 26 needs to be taken into account in the design of the mounting support if the mounting support 13 is to be wound on a winding spindle 26. As also clearly shown in FIG. 6, the fastening members 23 arranged along the strip form an integral component of the mounting support 13.

Figure 7A:
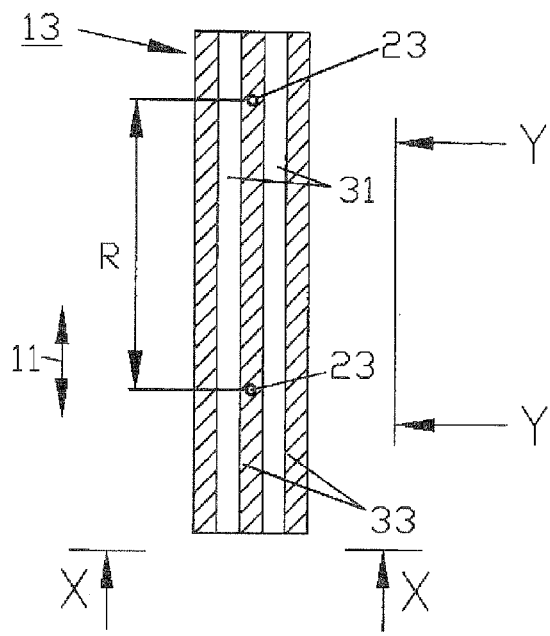
FIG. 7a shows a top view of a mounting support with a grooved structure.
Figure 7B:
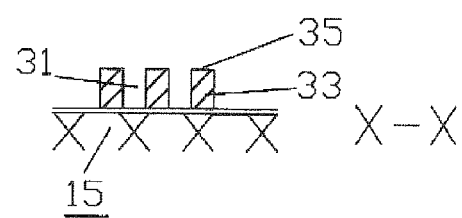
Figure 7C:
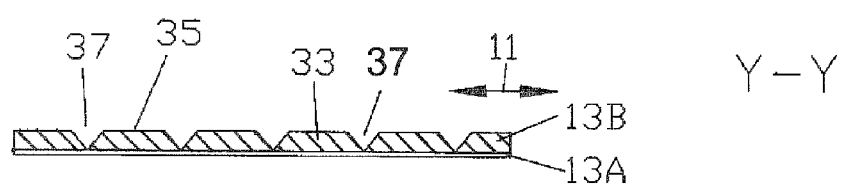

FIGS. 7a, 7b, 7c illustrate an alternative embodiment of the invention, wherein instead of the transverse recesses 17, longitudinal grooves 31, which define the ribs 33, are provided in the mounting support 13. The grooves 31 can be U-shaped (see FIG. 7b). Fastening members 23 are inserted in the ribs 33 with a predetermined spacing R therebetween. The surface of the ribs 33 forms a plateau 35 representing a flat support surface or structure configured to receive the photovoltaic modules 5.

As shown on the outermost right rib 33 in FIG. 7c (side view Y-Y), the ribs 33 may in addition include transverse recesses 37 which make it easier to roll up the mounting support 13. This produces cross-ribs with trapezoidal cross-section in the side view Y-Y.

Figure 8A:
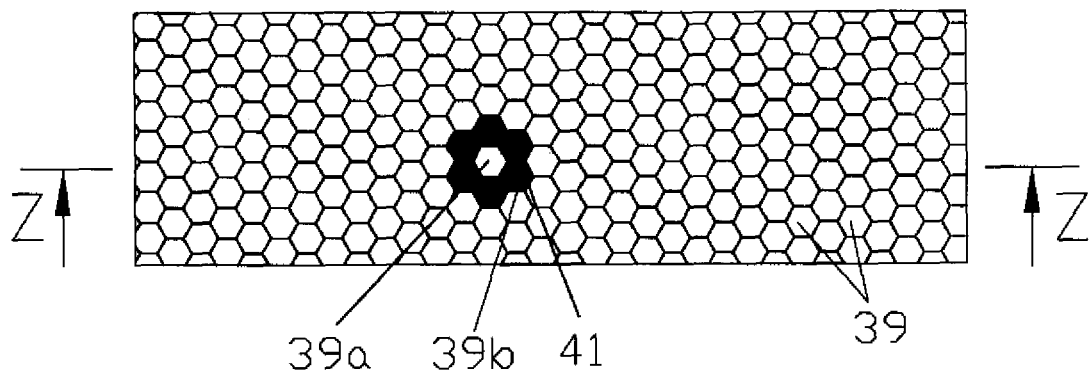
FIG. 8a shows a top view of another embodiment of a mounting support with a honeycomb structure.
Figure 8B:
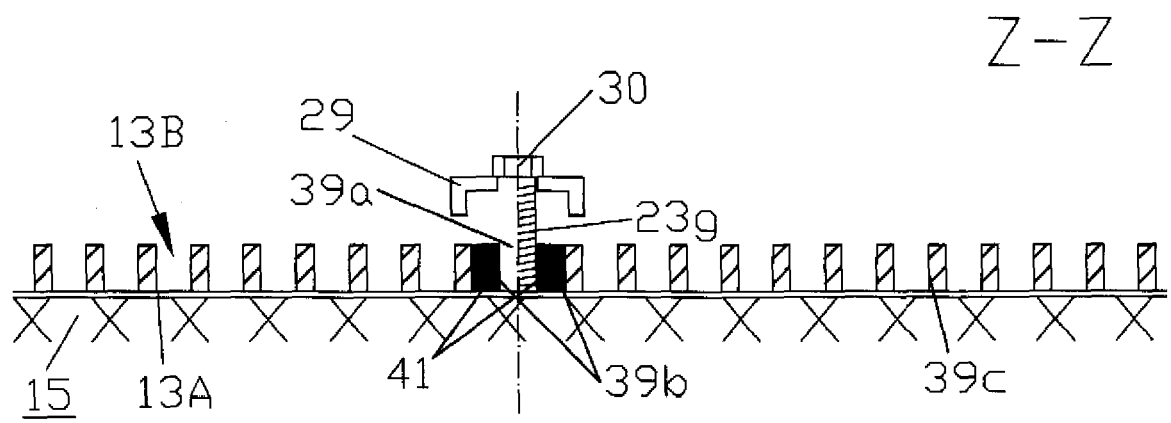

FIGS. 8a, 8b show a mounting support 13 which, instead of the recesses 17 or grooves 31, has a plurality of closely spaced small tubes 39 which are closed off at the bottom. The tubes 39 may preferably have the illustrated honeycomb structure, but may also have in cross-section the shape of a circle, rectangle or a truncated cone. In the depicted exemplary embodiment, the upper free ends of the tubes form the flat support surface or structure for receiving the photovoltaic modules 5. In the depicted exemplary embodiment, the fastening member is disposed in one of the centrally located tubes 39a. The fastening member can also be implemented as a thread or a threaded sleeve. Similar to the embodiment described above with reference to FIGS. 4 and 5, a screw 30 for a clamp 29 can be screwed into the corresponding thread for securing the (unillustrated) module 5. The tubes 39b adjoining the central tube 39a can be reinforced with a filler 41 so as to create a mechanically stable mounting support (formed by the top layer 13B). The remaining tubes 39c may then be hollow, enhancing the flexibility and contributing to material savings and weight reduction.

Figure 9:
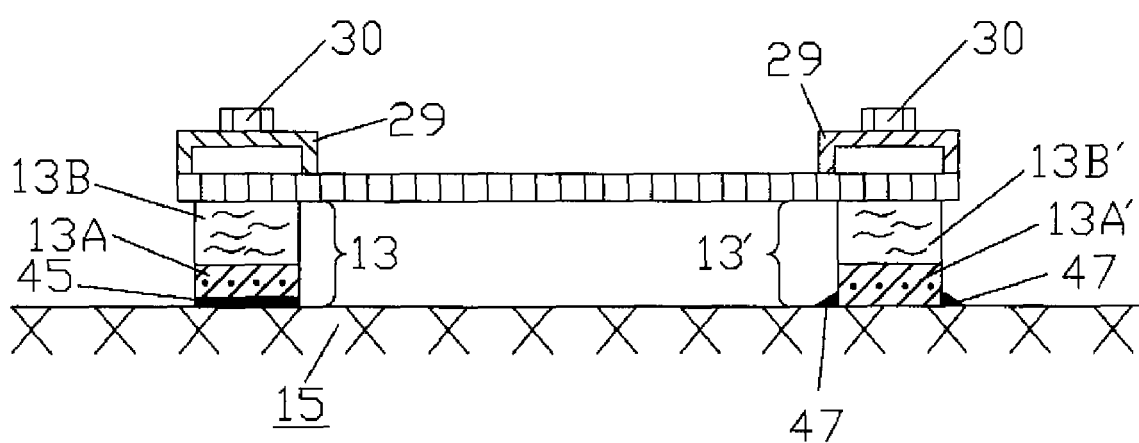
FIG. 9 shows a structure with two differently attached mounting supports.

FIG. 9 corresponds to a cross-section similar to that of FIG. 1. In general, a first mounting support 13 is attached to the roof surface 15 in an unrolled configuration, with a second unrolled mounting support 13' being attached on the roof surface 15 parallel to the first mounting support. In the exemplary embodiment depicted in FIG. 9, the first support 13 is attached to the roof surface 15 with an adhesive 45 in form of an adhesive layer, while the second (identical) support 13' is attached to the roof surface 15 by two longitudinal weld seams 47. it will be assumed that each clamp 29 (having a U-shaped cross-section) secures two modules 5 extending perpendicular to the drawing plane.

While the invention has been illustrated and described in connection with currently preferred embodiments shown and described in detail, it is not intended to be limited to the details shown since various modifications and structural changes may be made without departing in any way from the spirit of the present invention. For example, the modules and the mounting support may be connected with a snap connection instead of threaded sleeve, wherein the eyelet is incorporated in the mounting support and the ball-shaped part is fixedly installed in the module. It is only necessary that the fastening members are able to withstand the applied forces, i.e., being fixedly anchored in the mounting support, and that they are flush with or recessed in the top side of the mounting support, forming an integral component of the mounting support, meaning that they cannot be detached from the mounting support without damaging or destroying the mounting support.

The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A mounting support for mounting a plurality of photovoltaic modules constructed with at least one glass pane on a flat roof surface, comprising:
    a flexible elongated strip configured to be wound and unwound in a longitudinal direction of the strip, wherein a bottom side of the strip has a substantially smooth surface fixedly attached to the flat roof surface with an adhesive or longitudinal edges of the bottom side of the strip are welded to the roof surface, and a top side of the strip has a substantially flat support surface for receiving the photovoltaic modules, and a plurality of fastening members secured within the strip proximate to the top side of the strip, with the fastening members constructed as threaded sleeves or bushings, each fastening member having one or more anchoring wings embedded within the strip, wherein the fastening members are sufficiently spaced apart in the longitudinal direction of the strip to accommodate a photovoltaic module between the fastening members, and a screw or clamp screwed into a corresponding threaded sleeve or bushing for securing the photovoltaic modules on the top side of the strip.

2. The mounting support of claim 1, wherein the top side of the strip comprises recesses oriented perpendicular to the longitudinal direction of the strip, with the recesses separating corresponding strip segments, and wherein the fastening members are arranged in a part of the strip segments.

3. The mounting support of claim 1, wherein the top side of the strip comprises grooves oriented in the longitudinal direction of the strip and forming ribs therebetween, and wherein the fastening members are arranged in at least part of the ribs.

4. The mounting support of claim 3, wherein the top side of the strip has between 2 and 10 grooves forming between 3 and 11 corresponding ribs.

5. The mounting support of claim 1, wherein the top side of the strip comprises a plurality of tubes, and wherein the fastening members are each arranged in at least one of the tubes.

6. The mounting support of claim 5, wherein the tubes form in cross section a hexagonal honeycomb pattern.

7. The mounting support of claim 1, wherein the strip has a width between 100 mm and 200 mm.

8. The mounting support of claim 1, wherein the strip has a length between 5 m and 12 m when unwound.

9. The mounting support of claim 1, wherein the predetermined spacing is between 60 cm and 100 cm.

10. The mounting support of claim 1, wherein the predetermined spacing is 62.5 cm.

11. The mounting support of claim 1, wherein the strip is constructed as a two-layer sandwich structure, with the bottom side configured for attachment to the roof surface and the top side having transverse recesses or longitudinal grooves formed therein.

12. The mounting support of claim 2, wherein the recesses have a trapezoidal or triangular cross-section.

13. The mounting support of claim 3, wherein the grooves have a U-shaped cross-section.

14. The mounting support of claim 2, wherein the fastening members are arranged at a center of a strip segment.

15. The mounting support of claim 3, wherein the fastening members are arranged in a rib centrally located along the strip.

16. The mounting support of claim 5, wherein the fastening members are arranged in a centrally located tube.

17. The mounting support of claim 1, wherein a plurality of the flexible elongated strips are arranged mutually parallel to each other and attached to the flat roof surface.

\* \* \* \* \*